United States Patent
Nader et al.

(10) Patent No.: US 10,588,037 B2
(45) Date of Patent: Mar. 10, 2020

(54) METHOD, WIRELESS COMMUNICATION DEVICE AND COMPUTER PROGRAM FOR MAINTAINING A SET OF MONITORED CARRIERS

(71) Applicant: Telefonaktiebolaget LM Ericsson (publ), Stockholm (SE)

(72) Inventors: Ali Nader, Malmo (SE); Joakim Axmon, Kavlinge (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 243 days.

(21) Appl. No.: 15/323,455

(22) PCT Filed: Jul. 9, 2014

(86) PCT No.: PCT/EP2014/064712
§ 371 (c)(1),
(2) Date: Jan. 3, 2017

(87) PCT Pub. No.: WO2016/004989
PCT Pub. Date: Jan. 14, 2016

(65) Prior Publication Data
US 2017/0134977 A1    May 11, 2017

(51) Int. Cl.
*H04W 36/00* (2009.01)
*H04W 24/08* (2009.01)
(Continued)

(52) U.S. Cl.
CPC .......... *H04W 24/10* (2013.01); *H04W 24/08* (2013.01); *H04W 36/0083* (2013.01); *H04W 72/0453* (2013.01)

(58) Field of Classification Search
CPC .............................. H04W 24/10; H04W 24/08
See application file for complete search history.

(56) References Cited

U.S. PATENT DOCUMENTS

2007/0253339 A1* 11/2007 Ovadia et al. ............ H04J 1/16
370/252
2009/0047958 A1    2/2009 Rimhagen et al.
(Continued)

FOREIGN PATENT DOCUMENTS

| EP | 1006675 A2 | 6/2000 |
| EP | 1069797 A2 | 1/2001 |
| EP | 1152624 A1 | 11/2001 |

OTHER PUBLICATIONS

PCT International Search Report, dated Mar. 9, 2015, in connection with International Application No. PCT/EP2014/064712, all pages.
(Continued)

*Primary Examiner* — Angel T Brockman
(74) *Attorney, Agent, or Firm* — Leffler Intellectual Property Law, PLLC (57) ABSTRACT

In a wireless communication device, a subset of available carriers is maintained as monitored carriers for performing measurements and the set of monitored carriers is replenished from only a subset of available carriers. Consequently, the wireless communication device does not have to measure a large number of carriers when looking for optimal radio network coverage. At the same time the method ensures that there is always an available "bucket" of monitored carriers that may be used for signal measurement. This means that the wireless communication device does not have to use a lot of processing resources (and thereby battery power) while still ensuring stable radio contact with the radio network or networks.

15 Claims, 4 Drawing Sheets

(51) Int. Cl.
*H04W 24/10* (2009.01)
*H04W 72/04* (2009.01)

(56) References Cited

U.S. PATENT DOCUMENTS

| | | | | |
|---|---|---|---|---|
| 2009/0175183 A1* | 7/2009 | Mochizuki | ............ | H04W 36/18 370/252 |
| 2011/0122846 A1* | 5/2011 | Yu | ......................... | H04L 1/0042 370/335 |
| 2014/0086081 A1* | 3/2014 | Mack | ...................... | H04L 5/006 370/252 |

OTHER PUBLICATIONS

PCT Written Opinion, dated Mar. 9, 2015, in connection with International Application No. PCT/EP2014/064712, all pages.
3GPP TSG-RAN WG4 Meeting #70, R4-140895, Prague, Czech Republic, Feb. 10-14, 2014, Maximum number of carriers for UE to monitor in TS36.133, Nokia Corporation, NSN, 5 pages.
3GPP TSG-RAN WG4 Meeting #70, R4-140568, Prague, Czech Republic, Feb. 10-14, 2014, E-UTRA Requirements on Increasing Number of Carriers to Monitor, Qualcomm Inc., 3 pages.

\* cited by examiner

METHOD, WIRELESS COMMUNICATION DEVICE AND COMPUTER PROGRAM FOR MAINTAINING A SET OF MONITORED CARRIERS

TECHNICAL FIELD

Embodiments herein relate to a wireless communication system, and more specifically to maintaining a set of monitored carriers that are subject to radio signal measurements by a wireless communication device.

BACKGROUND

Wireless communication systems, i.e. systems that provide communication services to wireless communication devices such as mobile phones, smartphones etc. (often denoted by UE that is short for user equipment), have evolved during the last decade into systems that must utilize the radio spectrum in the most efficient manner possible. A reason for this is the ever increasing demand for high speed data communication capabilities in terms of, e.g., bitrate and to provide these capabilities at any given time and at any geographical location. This may be obtained by utilizing every available part of the radio frequency interval. Needless to say, this leads to an ever increasing demand for more and more powerful processing capabilities in the wireless communication devices in order to, e.g., schedule the use of the available radio frequency carriers.

Within the third generation partnership project (3GPP) there are currently discussions about increasing requirements on the amount of carriers a UE shall be able to keep track of. At the same time, there is a clear indication that wireless communication system operators are going to operate in radio environments that are characterized by scattered frequency intervals of comparatively small sizes due to the typical situation in many areas where there is a scarceness of available frequencies. As a result of this situation, the networks typically send information to UEs that there are a large number of radio frequency carriers available in the network and which carriers the UE needs to keep track of in order to operate in a satisfactory manner in the network.

For example, in the case of 3GPP long term evolution (LTE) systems (the situation is similar in other types of radio access technology (RAT) systems), a UE shall according to the 3GPP requirements be able to track four LTE frequencies when the UE is operating in in idle and connected mode. However, in the configuration information provided by the network (either through broadcast or dedicated messages), up to eight LTE frequencies can be configured for measurements.

Furthermore, since UEs are capable of handing over between, and operate in, several different RATs, there are discussions within 3GPP to increase even further the minimum number of inter-frequency carriers and cells a UE shall be able to monitor when camping on a radio cell of a universal mobile telecommunications system (UMTS) terrestrial radio access (UTRA) system and when camping on a cell of an evolved UTRA (EUTRA) system. For example, while camped on LTE a UE would need to keep track (i.e. perform regular signal measurements) of more than 20 carriers if configured so by the network (and that is without considering any carriers of a second generation and/or third generation RAT). Although this provides more freedom to a network operator, the network does not know on which of the configured carriers the UE will measure and with which periodicity it will do the measurements.

Consequently, it is quite clear the UEs will be required to measure on more and more carriers when communicating in 3GPP systems, and additionally measure on other radio access technologies such as wireless local area networks (WLAN) and the like. If a UE follows the configurations as discussed above and measures/tracks a large number of carriers when looking for optimal coverage, the UE will use a lot of processing resources and as a result of this quickly drain its battery. Alternatively, in order to not spend processing power on measuring/tracking a multitude of carriers, the UE could be configured to perform such measurements more sparsely, resulting in a scenario where each carrier is "revisited" very seldom with the final consequence of the UE losing contact with the networks altogether. Hence, there is a need for improved ways in which an UE measures carriers in a multi carrier environment.

Patent application publication US2009/0047958 describes methods related to handover between radio cells. Two sets of cells are discussed where signal strengths from the cells are measured with different measurement rates.

SUMMARY

An object of the present disclosure is to overcome or at least mitigate at least some of the drawbacks related to present day wireless communication devices when measuring carriers in a multi carrier environment.

Hence, in one aspect there is provided a method performed by a wireless communication device, for maintaining a set of monitored carriers that are subject to radio signal measurements by the wireless communication device. The set of monitored carriers is a first subset of all carriers that the wireless communication device is configured to utilize. The method comprises performing monitored carrier monitoring of each monitored carrier such that each monitored carrier is associated with a current quality. Any monitored carrier having a current quality that is lower than a required quality is deleted from the set of monitored carriers. If the set of monitored carriers is smaller than a first threshold number, a carrier search is performed, at a first search rate, for carriers from among a set of search carriers. The set of search carriers is a second subset of all carriers that the wireless communication device is configured to utilize. The carrier search is performed such that, if, in the carrier search, a carrier is found having a quality higher than a quality threshold, then the found carrier is added to the set of monitored carriers.

In other words, only a subset of available carriers is maintained as monitored carriers for performing measurements and the set of monitored carriers is replenished from only a subset of available carriers. Consequently, the wireless communication device does not have to measure a large number of carriers when looking for optimal radio network coverage. At the same time the method ensures that there is always an available "bucket" of monitored carriers that may be used for signal measurement. This means that the wireless communication device does not have to use a lot of processing resources (and thereby battery power) while still ensuring stable radio contact with the radio network or networks.

The addition of the found carrier to the set of monitored carriers may further be conditioned on the quality of the found carrier having been larger than the quality threshold for a specific duration. In such embodiments, an advantage is that a carrier may not be selected as a monitored carrier until it has a stable high quality.

In some embodiments, if the set of monitored carriers is smaller than a second threshold number that is lower than the first threshold number, the carrier search may be performed at a second search rate that is higher than the first search rate.

In some embodiments, if the set of monitored carriers is smaller than a third threshold number, the search carrier having a current quality that is lowest may be deleted from the set of search carriers, and a carrier that is not in the set of search carriers and not in the set of monitored carriers may be added to the set of search carriers.

In some embodiments, if the set of monitored carriers is smaller than a fourth threshold number, the carrier search may be performed during a time period when the wireless communication device is in a connected mode of operation and the carrier search may be performed based on a predetermined puncturing scheme.

In other words, if the "bucket" of monitored carriers is in danger of getting depleted, i.e. the number of monitored carriers being reduced in relation to the second, third and fourth threshold numbers, respectively, different measures may be taken to ensure that such depletion does not occur.

In some embodiments, a snapshot measurement is performed of signal strength of a plurality of carriers that are not in the set of search carriers and not in the set of monitored carriers. As a consequence of the snapshot measurement, a carrier that has a signal strength that is above a signal strength threshold may be added to the set of search carriers.

In other words, such a snapshot measurement may be carried out on a large number of carriers, e.g. larger than the number of carriers in the set of search carriers, and thereby ensuring that the set of search carriers is not depleted. It is to be noted that the expression "snapshot" is used in the present disclosure simply as a distinguishing name for a carrier measurement. No other meaning is to be implied by the use of the expression "snapshot".

In various embodiments, during the monitored carrier monitoring, any one of the first threshold, the second threshold, the third threshold and the fourth threshold may be adapted based on any of:

a number of receiver chains in the wireless communication device that is available for use to perform the carrier search, such that a low threshold is associated with a small number of receiver chains and a high threshold is associated with a large number of receiver chains, the quality of the monitored set of monitored carriers, such that a low threshold is associated with a high quality and a high threshold is associated with a low quality, a trend of the quality of the monitored set of monitored carriers, such that a low threshold is associated with an increasing trend and a high threshold is associated with a decreasing trend, an available time period for the monitoring of the set of monitored carriers, such that a low threshold is associated with a long period and a high threshold is associated with a short period, a type of service used by a user of the wireless communication device, such that a low threshold is associated with a non-time critical service and a high threshold is associated with a time critical service, a spatial movement speed of the wireless communication device, such that a low threshold is associated with a low speed and a high threshold is associated with a high speed, a state of operation of the wireless communication device, such that a low threshold is associated with an idle state and a high threshold is associated with a non-idle state, and historical information regarding availability of carriers, such that a low threshold is associated with a large number of available carriers and a high threshold is associated with a small number of available carriers.

In another aspect there is provided a wireless communication device, comprising radio frequency, RF, circuitry, a processor and a memory. The memory containing instructions executable by the processor whereby the wireless communication device is operative to maintain a set of monitored carriers that are subject to radio signal measurements by the wireless communication device. The set of monitored carriers is a first subset of all carriers that the wireless communication device is configured to utilize. The wireless communication device is operative to:

perform monitored carrier monitoring of each monitored carrier such that each monitored carrier is associated with a current quality, delete, from the set of monitored carriers, any monitored carrier having a current quality that is lower than a required quality, if the set of monitored carriers is smaller than a first threshold number, perform a carrier search, at a first search rate, for carriers from among a set of search carriers, said set of search carriers being a second subset of all carriers that the wireless communication device is configured to utilize, such that:

if, in said carrier search, a carrier is found having a quality higher than a quality threshold, then add said found carrier to the set of monitored carriers.

In another aspect there is provided a computer program, comprising instructions which, when executed on at least one processor in a node, cause the node to carry out the method as summarized above in connection with the first aspect and the various embodiments of the first aspect.

In another aspect there is provided a carrier comprising a computer program according to the summarized aspect above, wherein the carrier is one of an electronic signal, an optical signal, a radio signal and a computer readable storage medium.

These aspects provide the same effects and advantages as summarized above.

DETAILED DESCRIPTION

Figure 1:
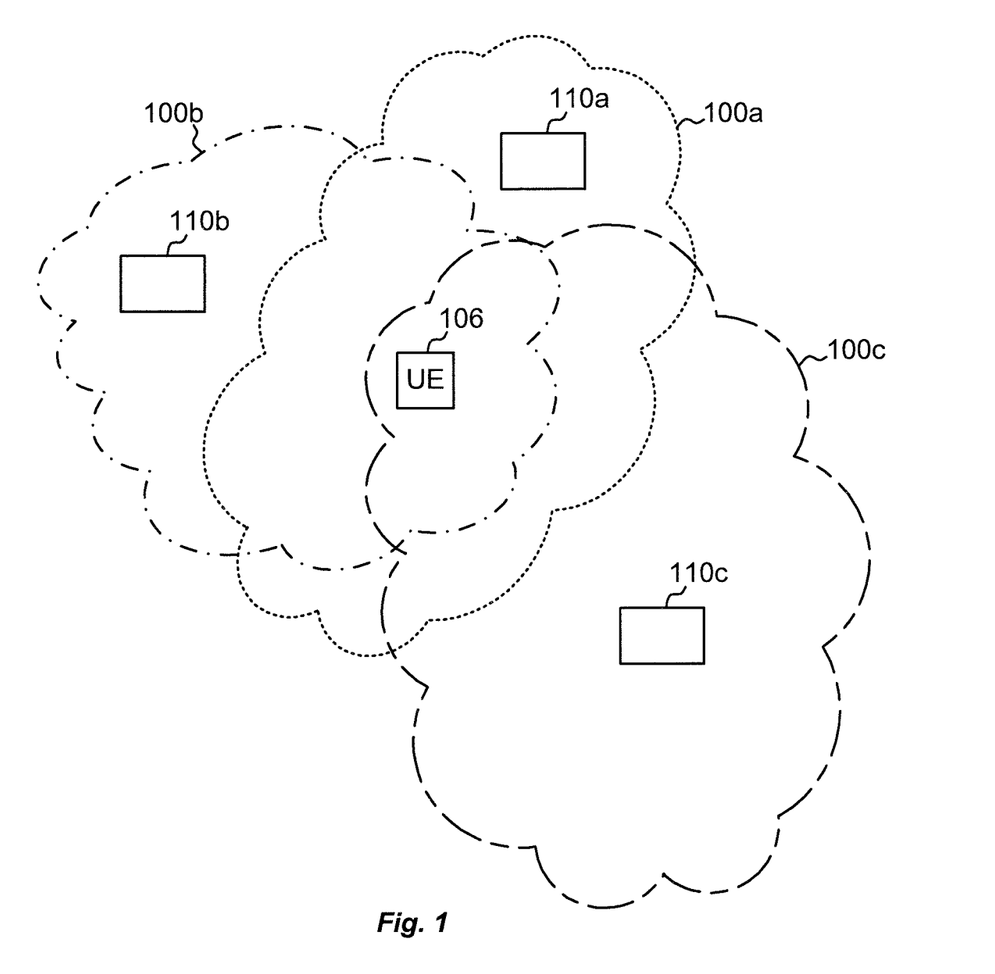
FIG. 1 schematically illustrates a plurality wireless communication systems and a wireless communication device.

FIG. 1 shows a wireless communication device (here denoted user equipment, UE) 106 that is located in an environment that is under coverage of several wireless communication systems 100a, 100b, 100c. Generally, the wireless communications systems 100 may be any 3GPP wireless communication system, such as a Long term evolution (LTE) Universal Mobile Telecommunication System (UMTS) Wideband Code Division Multiple Access (WCDMA) network, a Global System for Mobile communication (GSM), or the like. Moreover the wireless communication systems 100 may also be a system that operates according to any of the Institute of Electrical and Electronics Engineers (IEEE) 802.11 standard specifications or evolutions thereof. The wireless communication systems 100 comprise a number of network nodes that enable communication with UEs. Such network nodes, for example radio base stations, are in FIG. 1 represented with a respective node 110a, 110b and 110c. For the sake of clarity of the present description and since it is known to the skilled person, no further details will be described regarding how these nodes operate.

The wireless communication device 106 comprises radio communication circuitry and processing circuitry (as will be illustrated in connection with FIGS. 3 and 4) that enables the wireless communication device 106 to operate using a plurality of radio frequency carriers (denoted "carriers" in the following), as the skilled person will realize. For example, the wireless communication device 106 may be capable of operating using carriers of the different wireless communication systems as exemplified above.

Figure 2A:
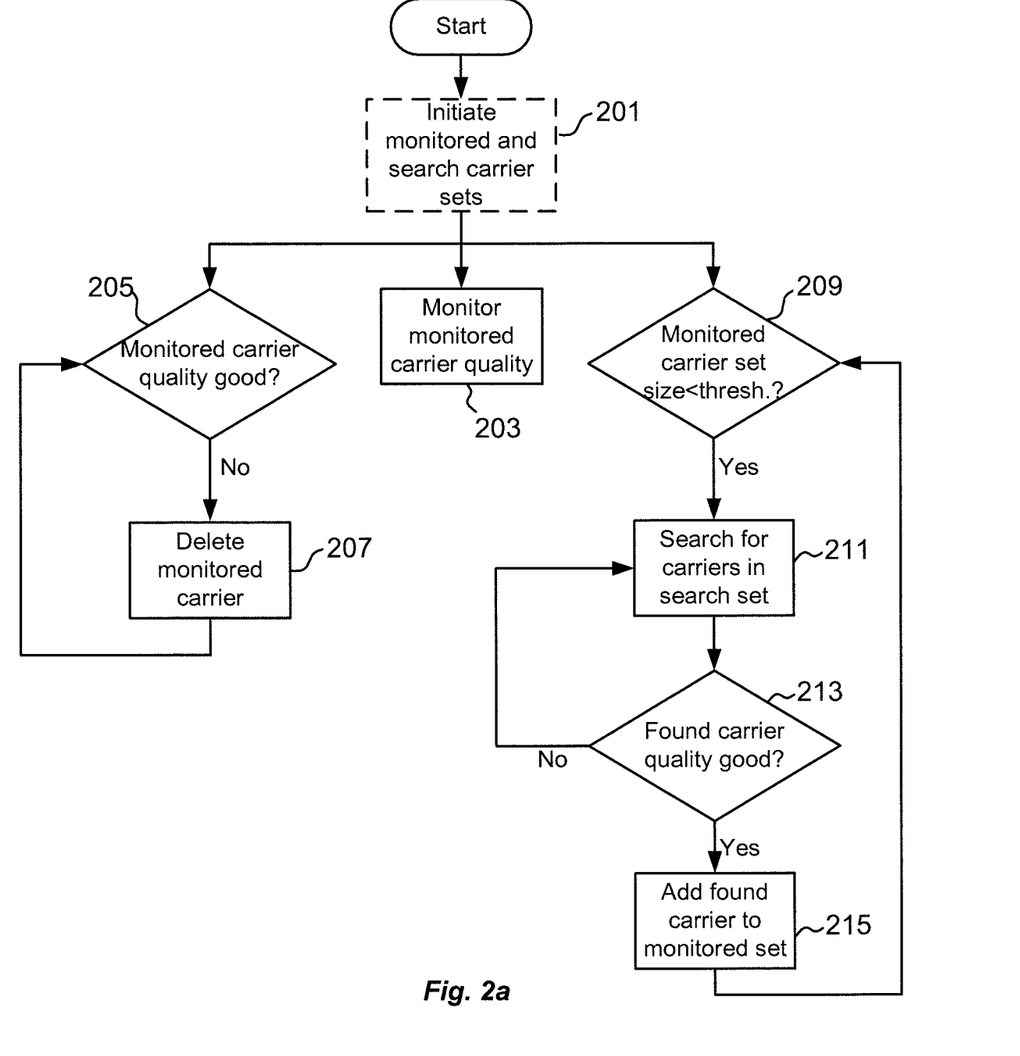
FIG. 2a is a flow chart of a method, FIG. 2b schematically illustrates a carrier search schedule.

Turning now to FIG. 2a and with continued reference to FIG. 1, a method will be described where the wireless communication device 106 maintains a set of monitored carriers on which monitored carriers signal measurements are made. The expression "monitored carrier" is to be understood as a carrier that has sufficient quality for carrying a certain service (circuit switched and/or packet switched service) to and/or from the wireless communication device 106. In a general context, a set of monitored carriers may comprise carriers of one or more systems that provide radio coverage at the location where the wireless communication device 106 is located. That is, a set of monitored carriers may comprise a LTE carrier as well as a WCDMA carrier and a carrier of a IEEE802.11 system. On the other hand, a set of monitored carriers may consist of only LTE carriers. In the following, the set of monitored carriers and the set of search carriers are subsets of all carriers that the wireless communication device 106 is configured to utilize.

Action 201

A set of monitored carriers and a set of search carriers are initiated by, e.g., assigning to the sets the first N carrier occurrences in a list of carriers in a predetermined configuration provided by the system with which the wireless communication device is communicating. Another example of initiating the sets of carriers is to take a snapshot measurement of all configured carriers and start off with the N best ones (here "best" may relate to quality as well as a priority order, if such information is provided by the system).

Action 203

Figure 2B:
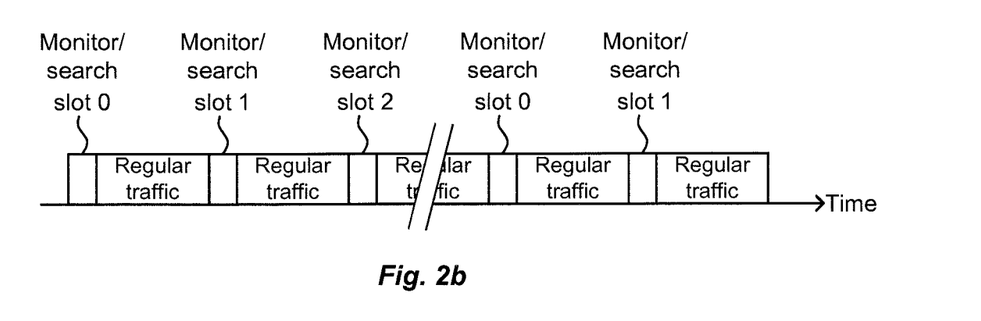

The carriers of the monitored set are monitored such that each monitored carrier is associated with a current quality of the carrier. For example, the monitoring may comprise monitoring a value such as a reference signal received quality (RSRQ) in case the monitored carrier is a LTE carrier, or any other appropriate quality measure that is available. The monitoring is a continuous process and it is performed according to a schedule at points in time, typically with a regular interval, when other activities in the wireless communication device 106 allow such monitoring. FIG. 2b illustrates schematically such a schedule of time slots when the monitoring of the monitored carriers may take place. Regular traffic is sharing the available time with periodically repeating time slots when monitoring of monitored carriers or search for carriers (as will be explained below) may take place. Such slots are in some systems denoted "idle slots". For example, the monitoring may take place in slot 0.

Actions 205 and 207

While the monitoring 203 is going on, continuous checking takes place of the quality of the monitored carriers and if it is detected that the quality is lower than a required quality, then the monitored carrier is deleted from the set of monitored carriers. The required quality is a threshold value that may be predetermined as well as a more dynamic value. For example, the system with which the wireless communication device is in contact with may provide a predetermined quality threshold. The threshold quality may also be a more or less "hardcoded" value in the wireless communication device itself.

Action 209

While the monitoring 203 is going on, checking takes place of the set of monitored carriers in terms of whether or not the set is smaller, i.e. the number of carriers in the set is smaller, than a first threshold number. This check is also continuous and, in combination with actions 209, 211, 213 and 215, ensures that the monitored set of carriers does not become empty (which would lead to loss of contact between the wireless communication device 106 and the networks 100). That is, considering the set of monitored carriers as a "bucket" of monitored carriers, a full bucket indicates that the wireless communication device is content with monitoring the monitored carriers in the "bucket" and does not need to search for other carriers.

Action 211

If, in the continuous checking in action 209, the set of monitored carriers is found to be smaller than the first threshold number, a search for carriers is started. This search is performed on a set of search carriers and the set of search carriers is a subset of all the carriers that the wireless communication device is configured to utilize. In practice, the search may be performed in terms of monitoring, at a first search rate, of a quality measure that is checked in a similar manner as for actions 203 and 205. If it is detected that the quality of a carrier in the search set is lower than a required quality, then the search continues. There may be a priority order according to which the carrier search is done. Such carrier priority information may be provided by the system with which the wireless communication device is communicating with; for example the priority information may be part of information provided during a registration procedure.

As illustrated in FIG. 2b, the search may be performed in the periodically repeating time slots that are available when no regular traffic is being received. For example, the search for carriers may take place in slot 1 or slot 2. However, depending on the duration of the monitor/search slot, the search for carriers may also take place in the same slot as the monitoring of the monitored carriers, i.e. in slot 0.

Moreover, if the set of monitored carriers is found to be smaller than a second threshold number that is lower than the first threshold number, the carrier search may be performed at a second search rate that is higher than the first search rate. For example, with reference to FIG. 2b, by searching in slot 1 as well as in slot 2, the search rate may be doubled.

Moreover, if the set of monitored carriers is found to be smaller than a third threshold number, the search carrier having a current quality that is lowest may be deleted from the set of search carriers, and carrier that is not in the set of search carriers and not in the set of monitored carriers may instead of that carrier be added to the set of search carriers. In other words, the poorest carrier in the search set is exchanged for a carrier that is not a carrier in the monitored set or in the search set.

Moreover, if the set of monitored carriers is found to be smaller than a fourth threshold number, the carrier search may be performed during a time period when the wireless communication device is in a connected mode of operation. The carrier search is then performed based on a predetermined puncturing scheme. For example, referring to FIG. 2b, puncturing of the intervals of regular traffic may provide such additional time periods when the search can be performed.

Action 213 and 215

If it is found, during the search in action 211 that the quality of a carrier in the carrier 25 search is higher than a quality threshold, then this carrier is added to the set of monitored carriers.

In actions 213 and 215, the monitoring of the quality of the search carriers may entail further conditioning the quality of the found carrier having been larger than the quality threshold for a specific duration. That is, a carrier is qualified as a monitored carrier after being above the quality threshold for a certain amount of time. Moreover, during the monitoring of the search carriers, a trend of the quality may also be considered.

With regard to the thresholds (i.e. first, second, third and fourth threshold) that are used in action 209, these thresholds may be predetermined numbers as well as more dynamic numbers that depend on various parameters. In other words, during the monitored carrier monitoring, any one of the first threshold, the second threshold, the third threshold and the fourth threshold is adapted based on any of:

A number of receiver chains in the wireless communication device that is available for use to perform the carrier search, such that a low threshold is associated with a small number of receiver chains and a high threshold is associated with a large number of receiver chains. That is, if there are a relatively large number of receiver chains, it is a relatively large probability that there will be a receiver chain that is available to start a carrier search at any time, i.e. even when the threshold is at a high level and a search is triggered very early when monitored carriers begin to be deleted.

The quality of the monitored set of monitored carriers, such that a low threshold is associated with a high quality and a high threshold is associated with a low quality.

A trend of the quality of the monitored set of monitored carriers, such that a low threshold is associated with an increasing trend and a high threshold is associated with a decreasing trend. That is, using the "bucket" analogy mentioned above, when the quality of the monitored carriers in the bucket is high or the trend is increasing, it is safe to allow the number of monitored carriers to decrease to a low number before starting a search or searching at a faster rate. Conversely, if the monitored carriers have low quality or a decreasing trend, there is a greater risk that these are deleted rather soon and therefore the threshold should be relatively higher (i.e. while there are still a few monitored carriers in the bucket) in order to make sure that a carrier search starts in time to replenish the bucket with monitored carriers.

An available time period for the monitoring of the set of monitored carriers, such that a low threshold is associated with a long period and a high threshold is associated with a short period. That is, if there is plenty of time to monitor the monitored carriers in the bucket then it is safe to allow a decrease of the number of monitored carriers to a small number before starting the carrier search or increasing the search rate.

A type of service used by a user of the wireless communication device, such that a low threshold is associated with a non-time critical service and a high threshold is associated with a time critical service. That is, it is rather important to make sure that the bucket of monitored carriers does not run the risk of getting empty, with the associated risk of losing a connection. A large threshold makes sure that a search can be started as soon as (for example) one monitored carrier has been deleted. For non-time critical services, it may not be as bad if a connection is lost due to a depletion of monitored carriers and therefore a low threshold may be used.

A spatial movement speed of the wireless communication device, such that a low threshold is associated with a low speed and a high threshold is associated with a high speed. That is, when a wireless communication device moves with a high speed, this means that the risk of losing many monitored carriers rather quickly is high. Therefore the threshold should be high in order to enable an early start of search when monitored carriers begin to be deleted from the bucket, and conversely low threshold is possible for a slow moving wireless communication device.

A state of operation of the wireless communication device, such that a low threshold is associated with an idle state and a high threshold is associated with a non-idle state. That is, when a wireless communication device is idle, then it is not in effect being used as seen from the perspective of a user and consequently it may not matter too much if the number of monitored carriers in the bucket gets low or even depleted (with the consequence of a lost connection) and therefore the threshold may be low.

Historical information regarding availability of carriers, such that a low threshold is associated with a large number of available carriers and a high threshold is associated with a small number of available carriers. That is, if there are plenty of carriers available for the searching for a new monitored carrier, then it is safe to allow a decrease of the number of monitored carriers to a small number before starting the search. Conversely, if the historical information says that there are only a low number of carriers that can be used in a search, then it is prudent to have a high threshold so that the search may start as soon as, e.g., one or two monitored carriers have been deleted.

Figure 2C:
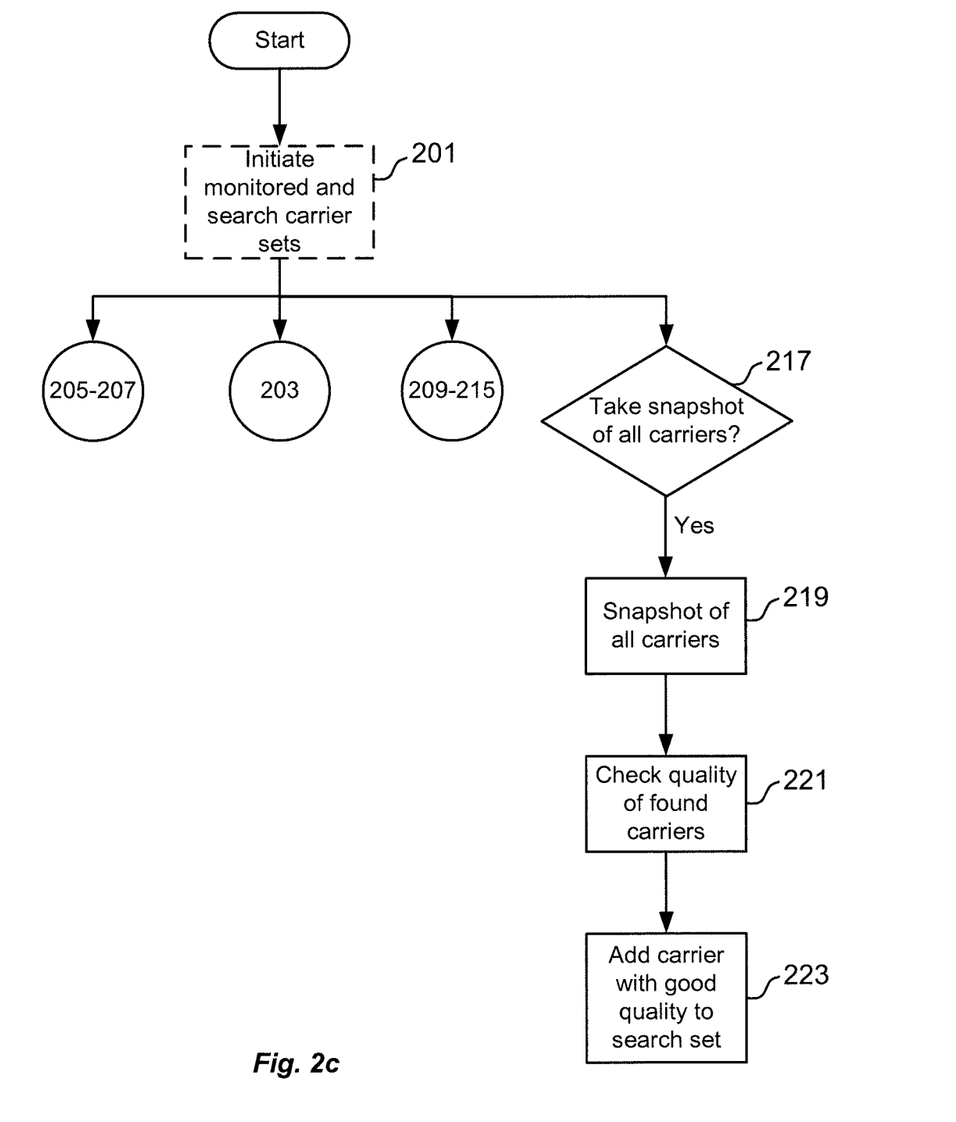
FIG. 2c is a flow chart of a method, FIG. 3 schematically illustrates a wireless communication device, and FIG. 4 schematically illustrates a wireless communication device.

Turning now to FIG. 2c, a situation will be described where it has become necessary to determine more or less all available carriers, i.e. all carriers that have not been subject of monitoring or a search as described above.

Action 217

In such a situation a decision may be taken as a consequence of a trigger and the decision thereby triggers the obtaining of a "snapshot" of all available carriers. Such a trigger may be that the number of monitored carriers in the monitored set has been lower than a threshold for a predetermined duration.

Actions 219, 221 and 223

A snapshot measurement is performed of signal strength of a plurality of carriers that are not in the set of search carriers and not in the set of monitored carriers. As a consequence of the snapshot measurement, a carrier that has a signal strength that is above a signal strength threshold is then added to the set of search carriers. For example, in a LTE system the signal strength measurement may be a received signal strength indicator (RSSI). The carriers found in the snapshot measurement may be prioritized such that the carrier that has the highest signal strength is added to the search set. Moreover, such snapshot signal strength measurement may be combined with historical information (i.e. based on track record of the carriers in the specific area or network in which the wireless communication device is currently located). For example, if it may be expected from such historical information that there are "islands" of good coverage on a particular carrier, then searching efforts on that carrier may be used although the situation may be that there is not a radio cell in existence in the area where the wireless communication device is currently located.

Figure 3:
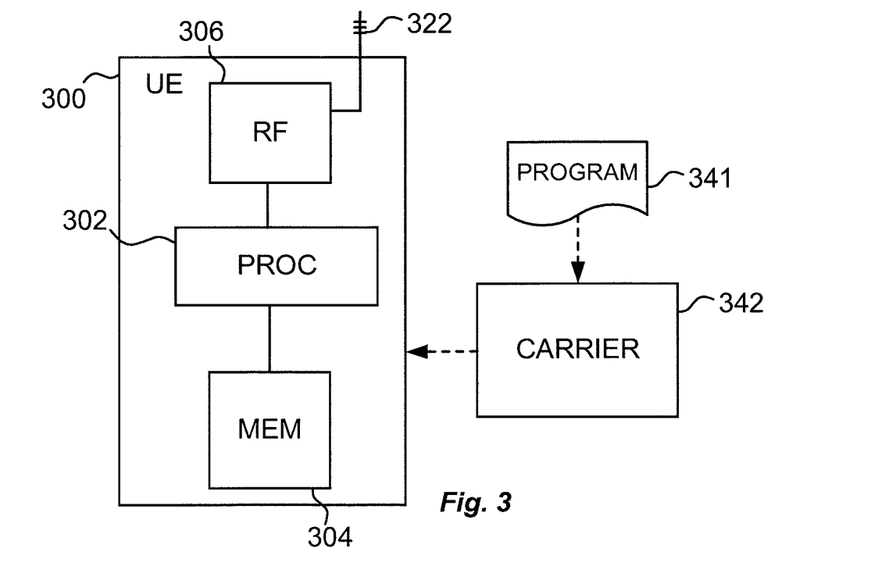

Turning now to FIG. 3, a wireless communication device or user equipment, UE, 300 will be described in some detail. The wireless communication device 300 may correspond to the wireless communication device 106 in FIG. 1. The wireless communication device 300 comprises a processor 302, a memory 304, radio frequency (RF) circuitry 306 and an antenna 322. Radio communication via the antenna 322 is realized by the RF circuitry 306 controlled by the processor 302. The memory 304 contains instructions executable by the processor 302 whereby the wireless communication device 300 is operative to maintain a set of monitored carriers that are subject to radio signal measurements by the wireless communication device 300, the set of monitored carriers being a first subset of all carriers that the wireless communication device is configured to utilize, and operative to:

perform monitored carrier monitoring of each monitored carrier such that each monitored carrier is associated with a current quality, delete, from the set of monitored carriers, any monitored carrier having a current quality that is lower than a required quality, if the set of monitored carriers is smaller than a first threshold number, perform a carrier search, at a first search rate, for carriers from among a set of search carriers, said set of search carriers being a second subset of all carriers that the wireless communication device is configured to utilize, such that:
if, in said carrier search, a carrier is found having a quality larger than a quality threshold, then add said found carrier to the set of monitored carriers.

The wireless communication device 300 may be operative such that the addition of said found carrier to the set of monitored carriers is further conditioned on the quality of said found carrier having been larger than the quality threshold for a specific duration.

The wireless communication device 300 may be operative to:
if the set of monitored carriers is smaller than a second threshold number that is lower than the first threshold number, perform the carrier search at a second search rate that is higher than the first search rate.

The wireless communication device 300 may be operative to:
if the set of monitored carriers is smaller than a third threshold number, delete from the set of search carriers the search carrier having a current quality that is lowest, and add to the set of search carriers a carrier that is not in the set of search carriers and not in the set of monitored carriers.

The wireless communication device 300 may be operative to:
if the set of monitored carriers is smaller than a fourth threshold number, perform the carrier search during a time period when the wireless communication device is in a connected mode of operation and perform the carrier search based on a predetermined puncturing scheme.

The wireless communication device 300 may be operative to:
perform a snapshot measurement of signal strength of a plurality of carriers that are not in the set of search carriers and not in the set of monitored carriers,
add, as a consequence of said snapshot measurement, to the set of search carriers, a carrier that has a signal strength that is above a signal strength threshold.

The wireless communication device 300 may be operative to, during the monitored carrier monitoring, adapt any one of the first threshold, the second threshold, the third threshold and the fourth threshold, based on any of:
a number of receiver chains in the wireless communication device that is available for use to perform the carrier search, such that a low threshold is associated with a small number of receiver chains and a high threshold is associated with a large number of receiver chains,
the quality of the monitored set of monitored carriers, such that a low threshold is associated with a high quality and a high threshold is associated with a low quality,
a trend of the quality of the monitored set of monitored carriers, such that a low threshold is associated with an increasing trend and a high threshold is associated with a decreasing trend,
an available time period for the monitoring of the set of monitored carriers, such that a low threshold is associated with a long period and a high threshold is associated with a short period,
a type of service used by a user of the wireless communication device, such that a low threshold is associated with a non-time critical service and a high threshold is associated with a time critical service,
a spatial movement speed of the wireless communication device, such that a low threshold is associated with a low speed and a high threshold is associated with a high speed,
a state of operation of the wireless communication device, such that a low threshold is associated with an idle state and a high threshold is associated with a non-idle state, and
historical information regarding availability of carriers, such that a low threshold is associated with a large number of available carriers and a high threshold is associated with a small number of available carriers.

The instructions that are executable by the processor 302 may be software in the form of a computer program 341. The computer program 341 may be contained in or by a carrier 342, which may provide the computer program 341 to the memory 304 and processor 302. The carrier 342 may be in any suitable form including an electronic signal, an optical signal, a radio signal or a computer readable storage medium.

Figure 4:
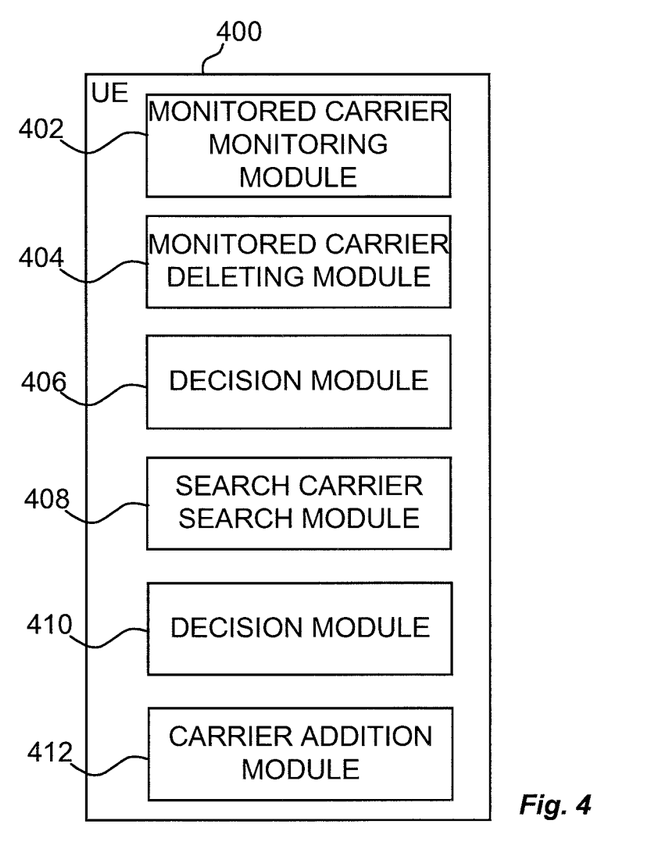

FIG. 4 illustrates a wireless communication device 400 or user equipment (UE) 400. The wireless communication device 400 may correspond to the wireless communication device 106 in FIG. 1. The wireless communication device 400 is operative to maintain a set of monitored carriers that are subject to radio signal measurements by the wireless communication device, said set of monitored carriers being a first subset of all carriers that the wireless communication device is configured to utilize. The wireless communication device 400 comprises:

a monitored carrier monitoring module 402 configured to perform monitored carrier monitoring of each monitored carrier such that each monitored carrier is associated with a current quality, a monitored carrier deleting module 404 configured to delete, from the set of monitored carriers, any monitored carrier having a current quality that is lower than a required quality, a decision module 406 configured to decide if the set of monitored carriers is smaller than a first threshold number, a search carrier search module 408 configured to perform a carrier search, at a first search rate, for carriers from among a set of search carriers, said set of search carriers being a second subset of all carriers that the wireless communication device is configured to utilize, a decision module 410 configured to decide if, in said carrier search, a carrier is found having a quality larger than a quality threshold, and a carrier addition module 412 configured to add said found carrier to the set of monitored carriers.

The wireless communication device 400 may comprise further modules that are configured to operate in a similar manner as the node described above in connection with FIG. 3.

As used herein, the term "processing module" or "module" may refer to a processing circuit, a processing unit, a processor, an Application Specific integrated Circuit (ASIC), a Field-Programmable Gate Array (FPGA) or the like. As an example, a processor, an ASIC, an FPGA or the like may comprise one or more processor kernels. In some examples, the processing module may be embodied by a software module or hardware module. Any such module may be a determining means, estimating means, capturing means, associating means, comparing means, identification means, selecting means, receiving means, transmitting means or the like as disclosed herein. As an example, the expression "means" may be a module, such as a determining module, selecting module, etc.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a wireless communication device, for maintaining a set of monitored carriers that are subject to radio signal measurements by the wireless communication device, said set of monitored carriers being a first subset of all carriers that the wireless communication device is configured to utilize, the method comprising:

performing monitored carrier monitoring of each monitored carrier such that each monitored carrier is associated with a current quality, deleting, from the set of monitored carriers, any monitored carrier having a current quality that is lower than a required quality, if the set of monitored carriers is smaller than a first threshold number, performing a carrier search, at a first search rate, for carriers from among a set of search carriers, said set of search carriers being a second subset of all carriers that the wireless communication device is configured to utilize, such that:

if, in said carrier search, a carrier is found having a quality higher than a quality threshold, then adding said found carrier to the set of monitored carriers, wherein the first threshold number is adapted based on any of:

a number of receiver chains in the wireless communication device that is available for use to perform the carrier search, the quality of the monitored set of monitored carriers, a trend of the quality of the monitored set of monitored carriers, an available time period for the monitoring of the set of monitored carriers, a type of service used by a user of the wireless communication device, a spatial movement speed of the wireless communication device, a state of operation of the wireless communication device, and historical information regarding availability of carriers.

2. The method of claim 1, wherein the addition of said found carrier to the set of monitored carriers is further conditioned on the quality of said found carrier having been larger than the quality threshold for a specific duration.

3. The method of claim 1, wherein:

if the set of monitored carriers is smaller than a second threshold number that is lower than the first threshold number, performing the carrier search at a second search rate that is higher than the first search rate.

4. The method of claim 1, wherein:

if the set of monitored carriers is smaller than a third threshold number, deleting from the set of search carriers the search carrier having a current quality that is lowest, and adding to the set of search carriers a carrier that is not in the set of search carriers and not in the set of monitored carriers.

5. The method of claim 1, wherein:
if the set of monitored carriers is smaller than a fourth threshold number, performing the carrier search during a time period when the wireless communication device is in a connected mode of operation and wherein the carrier search is performed based on a predetermined puncturing scheme.

6. The method of claim 1, comprising:
performing a snapshot measurement of signal strength of a plurality of carriers that are not in the set of search carriers and not in the set of monitored carriers,
adding, as a consequence of said snapshot measurement, to the set of search carriers, a carrier that has a signal strength that is above a signal strength threshold.

7. The method of claim 1, wherein, during the monitored carrier monitoring, the first threshold number is adapted based on any of:
the number of receiver chains in the wireless communication device that is available for use to perform the carrier search, such that a low threshold is associated with a small number of receiver chains and a high threshold is associated with a large number of receiver chains,
the quality of the monitored set of monitored carriers, such that a low threshold is associated with a high quality and a high threshold is associated with a low quality,
the trend of the quality of the monitored set of monitored carriers, such that a low threshold is associated with an increasing trend and a high threshold is associated with a decreasing trend,
the available time period for the monitoring of the set of monitored carriers, such that a low threshold is associated with a long period and a high threshold is associated with a short period,
the type of service used by a user of the wireless communication device, such that a low threshold is associated with a non-time critical service and a high threshold is associated with a time critical service,
the spatial movement speed of the wireless communication device, such that a low threshold is associated with a low speed and a high threshold is associated with a high speed,
the state of operation of the wireless communication device, such that a low threshold is associated with an idle state and a high threshold is associated with a non-idle state, and
the historical information regarding availability of carriers, such that a low threshold is associated with a large number of available carriers and a high threshold is associated with a small number of available carriers.

8. A wireless communication device, comprising radio frequency, RF, circuitry, a processor and a memory, said memory containing instructions executable by said processor whereby said wireless communication device is operative to maintain a set of monitored carriers that are subject to radio signal measurements by the wireless communication device, said set of monitored carriers being a first subset of all carriers that the wireless communication device is configured to utilize, and operative to:
perform monitored carrier monitoring of each monitored carrier such that each monitored carrier is associated with a current quality,
delete, from the set of monitored carriers, any monitored carrier having a current quality that is lower than a required quality,
if the set of monitored carriers is smaller than a first threshold number, perform a carrier search, at a first search rate, for carriers from among a set of search carriers, said set of search carriers being a second subset of all carriers that the wireless communication device is configured to utilize, such that:
if, in said carrier search, a carrier is found having a quality larger than a quality threshold, then add said found carrier to the set of monitored carriers,
wherein the first threshold number is adapted based on any of:
a number of receiver chains in the wireless communication device that is available for use to perform the carrier search,
the quality of the monitored set of monitored carriers,
a trend of the quality of the monitored set of monitored carriers,
an available time period for the monitoring of the set of monitored carriers,
a type of service used by a user of the wireless communication device,
a spatial movement speed of the wireless communication device,
a state of operation of the wireless communication device, and
historical information regarding availability of carriers.

9. The wireless communication device of claim 8, being operative such that the addition of said found carrier to the set of monitored carriers is further conditioned on the quality of said found carrier having been larger than the quality threshold for a specific duration.

10. The wireless communication device of claim 8, being operative to:
if the set of monitored carriers is smaller than a second threshold number that is lower than the first threshold number, perform the carrier search at a second search rate that is higher than the first search rate.

11. The wireless communication device of claim 8, being operative to:
if the set of monitored carriers is smaller than a third threshold number, delete from the set of search carriers the search carrier having a current quality that is lowest, and add to the set of search carriers a carrier that is not in the set of search carriers and not in the set of monitored carriers.

12. The wireless communication device of claim 8, being operative to:
if the set of monitored carriers is smaller than a fourth threshold number, perform the carrier search during a time period when the wireless communication device is in a connected mode of operation and perform the carrier search based on a predetermined puncturing scheme.

13. The wireless communication device of claim 8, being operative to:
perform a snapshot measurement of signal strength of a plurality of carriers that are not in the set of search carriers and not in the set of monitored carriers,
add, as a consequence of said snapshot measurement, to the set of search carriers, a carrier that has a signal strength that is above a signal strength threshold.

14. The wireless communication device of claim 8, being operative to, during the monitored carrier monitoring, adapt the first threshold number based on any of:
the number of receiver chains in the wireless communication device that is available for use to perform the carrier search, such that a low threshold is associated with a small number of receiver chains and a high threshold is associated with a large number of receiver chains, the quality of the monitored set of monitored carriers, such that a low threshold is associated with a high quality and a high threshold is associated with a low quality, the trend of the quality of the monitored set of monitored carriers, such that a low threshold is associated with an increasing trend and a high threshold is associated with a decreasing trend, the available time period for the monitoring of the set of monitored carriers, such that a low threshold is associated with a long period and a high threshold is associated with a short period, the type of service used by a user of the wireless communication device, such that a low threshold is associated with a non-time critical service and a high threshold is associated with a time critical service, the spatial movement speed of the wireless communication device, such that a low threshold is associated with a low speed and a high threshold is associated with a high speed, the state of operation of the wireless communication device, such that a low threshold is associated with an idle state and a high threshold is associated with a non-idle state, and the historical information regarding availability of carriers, such that a low threshold is associated with a large number of available carriers and a high threshold is associated with a small number of available carriers.

15. A nontransitory computer readable storage medium comprising instructions which, when executed on at least one processor in a wireless communication device, cause the wireless communication device to carry out a method for maintaining a set of monitored carriers that are subject to radio signal measurements by the wireless communication device, said set of monitored carriers being a first subset of all carriers that the wireless communication device is configured to utilize, the method comprising:

performing monitored carrier monitoring of each monitored carrier such that each monitored carrier is associated with a current quality, deleting, from the set of monitored carriers, any monitored carrier having a current quality that is lower than a required quality, if the set of monitored carriers is smaller than a first threshold number, performing a carrier search, at a first search rate, for carriers from among a set of search carriers, said set of search carriers being a second subset of all carriers that the wireless communication device is configured to utilize, such that:

if, in said carrier search, a carrier is found having a quality higher than a quality threshold, then adding said found carrier to the set of monitored carriers, wherein the first threshold number is adapted based on any of:

a number of receiver chains in the wireless communication device that is available for use to perform the carrier search, the quality of the monitored set of monitored carriers, a trend of the quality of the monitored set of monitored carriers, an available time period for the monitoring of the set of monitored carriers, a type of service used by a user of the wireless communication device, a spatial movement speed of the wireless communication device, a state of operation of the wireless communication device, and historical information regarding availability of carriers.

* * * * *